Feb. 2, 1971     H. C. SHAW, JR     3,560,061

MEANS FOR MOUNTING TRANSLATING MACHINE MEMBER

Filed July 11, 1968

INVENTOR:
HOWARD C. SHAW, JR.
BY
Dawson, Tilton, Fallon & Lungmus
ATT'YS

United States Patent Office 3,560,061
Patented Feb. 2, 1971

3,560,061
MEANS FOR MOUNTING TRANSLATING MACHINE MEMBER
Howard C. Shaw, Jr., 1955 Quarton Road,
Bloomfield Hills, Mich. 48013
Continuation-in-part of application Ser. No. 694,751, Dec. 29, 1967, which is a continuation of application Ser. No. 494,821, Oct. 11, 1965. This application July 11, 1968, Ser. No. 744,025
The portion of the term of the patent subsequent to Apr. 12, 1985, has been disclaimed and dedicated to the Public
Int. Cl. F16c *19/08*
U.S. Cl. 308—6                                    1 Claim

ABSTRACT OF THE DISCLOSURE

The use of specially designed mounting configurations for way bearings of the roller-raceway variety in order to minimize the space required by the bearings and the amount of machining ordinarily required on the mounting face of the machine member. In one aspect, the bearing provides a mounting surface between the upper and lower runs to mate with confronting surfaces on the mounting face of the machine member, thereby allowing maximum section strength and minimum machine assembly profile. Where section strength and machine profile are of secondary importance, the bearing mounting utilizes two arcuately contoured surfaces, perpendicularly related between the bearing and the machine member to compensate for manufacturing imperfections.

---

This application is a continuation-in-part of my copending application Ser. No. 694,751 filed Dec. 29, 1967, now Pat. No. 3,410,614, which application was a continuation of my then co-pending application Ser. No. 494,821 filed Oct. 11, 1965, now abandoned.

BACKGROUND AND SUMMARY OF INVENTION

In many instances a translating machine member has restricted height or thickness. When it is deemed advisable to mount such a member on an antifriction way bearing so as to develop precise positioning, conventional mounting expedients may so weaken the section as to result in misoperation, premature failure, or at least forcing a design compromise on the height profile of the machine section. The invention here avoids these drawbacks through the use of a unique mounting construction and method and the provision of such constitutes an important object of the invention. Another important object of the invention is provided through the use of a unique adapter whereby extensive and expensive machining can be avoided on the mounting face of the member, the adapter being provided as a desirable and advantageous supplement to any antifriction way bearing.

DETAILED DESCRIPTION

The invention is described in conjunction with the accompanying drawing, in which—

Figure 1:
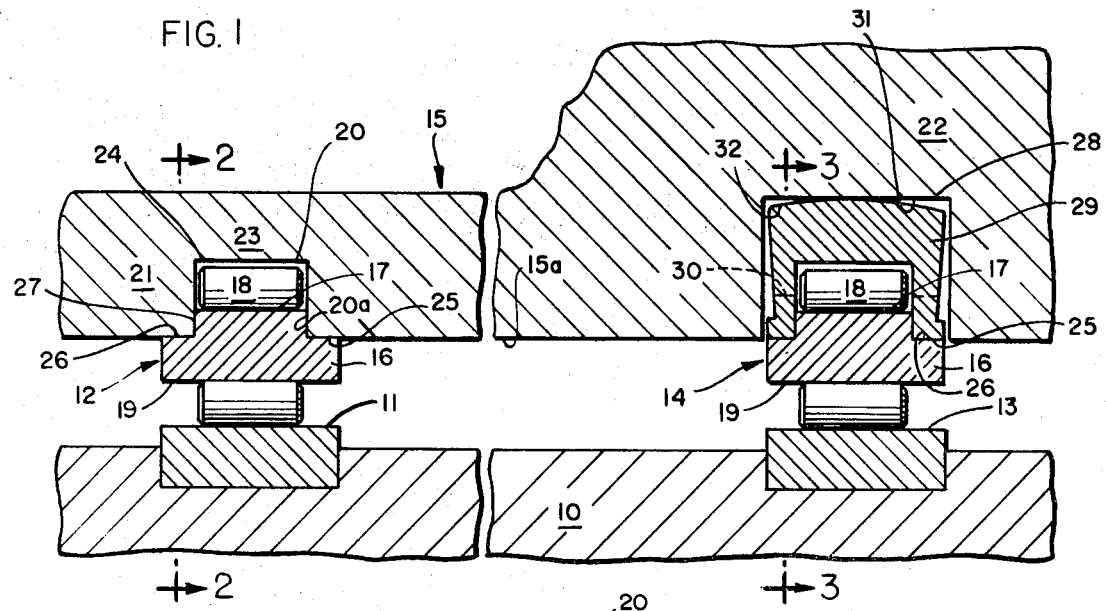
FIG. 1 is a fragmentary sectional view of a portion of a machine incorporating an indexable carriage.

In the illustration given and with reference first to FIG. 1, the numeral 10 designates the frame or stationary portion of the machine and which is constructed to provide a flat stationary race as at 11 for an antifriction way bearing generally designated 12 to roll upon. A similar race 13 is provided for a similar antifriction way bearing generally designated 14 and these bearings are employed to indexably support a machine member generally designated 15. Antifriction way bearings of the type seen in my above-referred-to patent may be used advantageously herein.

Each of the bearings 12, 14 includes a raceway or body portion 16 which provides an upper central surface 17 (designated only in FIG. 1) serving as a return track for the generally cylindrical bearing elements 18. The elements 18 are arranged to move in an orbital path in conventional fashion, with the lower run providing the support for the machine member 15. More particularly, the lower run occurs between the races 11, 13 and the under surface 19 of the body 16.

Figure 2:
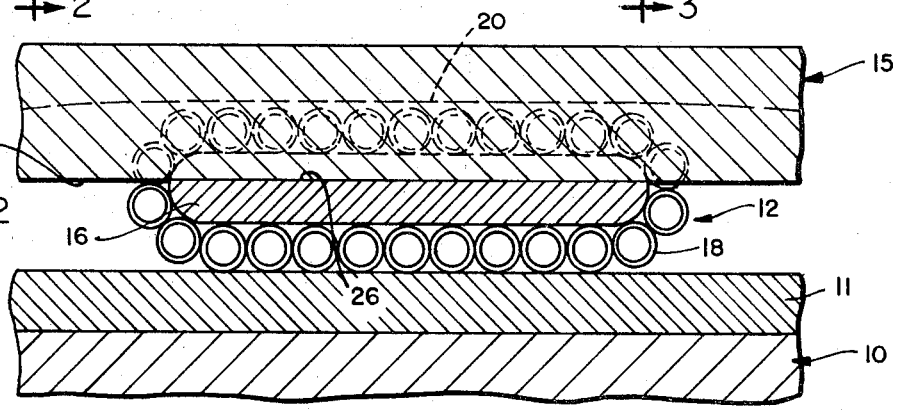
FIG. 2 is a sectional view taken along the sight line 2—2 applied to FIG. 1.

In the embodiment of the invention seen in the left-hand portion of FIG. 1, and detailed further in FIG. 2, the return run of the bearing elements 18 occurs within an elongated slot 20 which has been cut into the mounting face 15a of the machine member 15. It will be noted that the section thickness of the machine member 15 in the area 21 is relatively thin as compared, for example, with the area designated 22 in FIG. 1. I avoid the imposition of stress in the reduced section 23 immediately above the slot 20 by virtue of having a clearance between the top wall 24 of the slot and the upper run of the bearing elements 18. Instead, the loading is transmitted to the body 16 by a pair of machined surfaces 25 on the mounting face 15a of the machine member 15. These confront and abut similarly machined upwardly facing surfaces 26 on the bearing body 16. Also provided are aligning surfaces consisting of surfaces 27 on the body 16 (perpendicularly related to the surfaces 26) and 20a in the slot 20. These are utilized to stabilize the bearing 12 against disadvantageous lateral movement.

Thus, when it is desired to install antifriction way bearings in a machine having a movable machine member of restricted section, it is necessary to mill in the slot 20 to rough tolerance only. The mounting areas immediately adjacent the elongated slot 20 (as at 25) are easily accessible for machining to control mounting tolerance. It is unnecessary to attempt to machine to fine bearing tolerances in a depression as would be the case if the upper wall 24 of the slot 20 were to be finished for the mounting of a conventional linear way bearing. Thus, from the provision of machined bearing surfaces 26 and, in some cases, 27, along the sides of the body 16 and intermediate the surfaces defining the upper and lower runs thereof, I am enabled to facilitate the installation of orbital way bearings on machines equipped with translating machine members.

For this purpose, it will be seen that the body 16 has laterally projecting portions to define the surfaces 26 and 27. The surfaces 26 projects substantially beyond the main portion defining the surface 17—the latter being necessary for supporting the return run of the bearing elements 18. Ordinarily, the lateral extent of the two surfaces 26 will be in the range of 10–50% of the total width dimension of the body 16.

Figure 3:
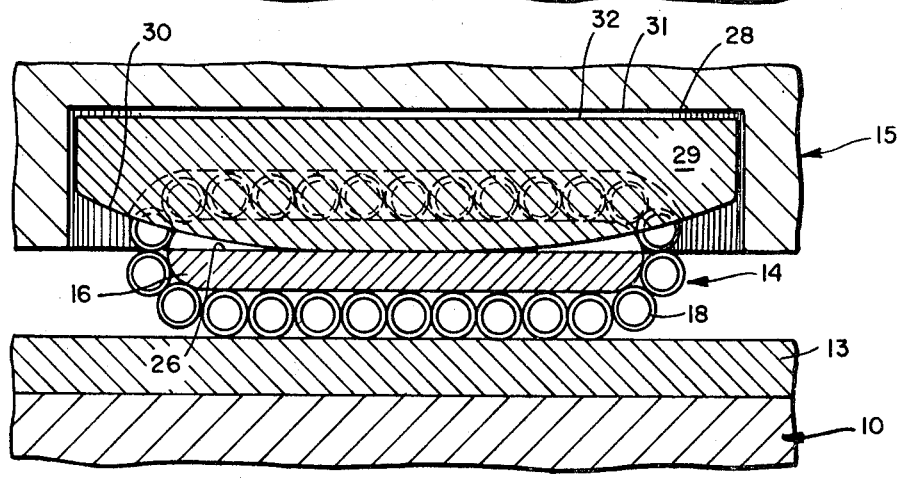
FIG. 3 is a sectional view taken along the sight line 3—3 applied to FIG. 1.

As mentioned previously, there may be instances where the section strength is not a deciding factor and, the extent and cost of the fine machining to provide for bearing mounting is a significant consideration. This situation is represented by the construction depicted at the right-hand side of FIG. 1, and in FIG. 3. In such a case, to facilitate the installation of an orbital way bearing 14, I provide for the milling of a substantially larger slot 28 to ordinary tolerances. The slot 28 accommodates the receipt of an adapter 29 which is seen to contact the way bearing on the machine surfaces 26. For this contact, I equip the adapter 29 with an arcuately contoured confronting surface as at 30 (best seen in FIG. 3). The adapter also contacts the upper wall 31 of the slot 28 through a transversely arcuately contoured confronting surface 32 provided on the adapter 29. Because of the self-compensating effect of these two arcuately contoured surfaces on adapter 29, it is unnecessary to resort to precise machining of mounting surface 31 to insure that the way bearing properly confronts the flat stationary race 11.

I claim:

1. In a machine having a frame providing a race means, a translating machine member arranged to move thereon, a plurality of orbital way bearings interposed between said member and said race means, each bearing having a relatively elongated body providing parallel rolling and mounting surfaces and an orbital path including said rolling surface for roller bearing elements, a plurality of elongated roller bearing elements in said path arranged in side-by-side relation, at least one of said bodies having laterally extending projections providing laterally spaced apart longitudinally extending support surfaces, said one body being equipped with an adapter on the said support surfaces, said adapter having arcuately contoured surfaces in confronting relation with said support surfaces, said member mounting surface having therein an elongated slot sized and arranged to receive said adapter in providing a recessed surface generally parallel to said mounting surface, said adapter having a second arcuately contoured face in confronting relation with the recessed surface of said slot, the arcuate curvature of said two arcuately contoured surfaces being perpendicularly related, the race means and body rolling surface being machined so that the departure of the same from parallelism is not more than about 0.003" per inch.

References Cited

UNITED STATES PATENTS

| | | | |
|---|---|---|---|
| 3,000,674 | 9/1961 | Ford | 308—6C |
| 3,230,018 | 1/1966 | Stallman | 308—6C |
| 3,246,933 | 5/1966 | Better | 308—6C |
| 3,410,614 | 11/1968 | Shaw | 308—6C |
| 667,684 | 2/1901 | Deharde | 308—185 |
| 3,272,569 | 9/1966 | Mergen | 308—6C |
| 3,301,611 | 1/1967 | Dunlap | 308—6CX |
| 3,304,133 | 2/1967 | Strassberg | 308—6C |
| 3,389,625 | 6/1968 | Wagner | 308—6C |

MANUEL A. ANTONAKAS, Primary Examiner

U.S. Cl. X.R.

308—185